United States Patent
Sobh et al.

(10) Patent No.: US 11,544,962 B2
(45) Date of Patent: Jan. 3, 2023

(54) MULTI-ALGORITHM-BASED FACE RECOGNITION SYSTEM AND METHOD WITH OPTIMAL DATASET PARTITIONING FOR A CLOUD ENVIRONMENT

(71) Applicant: FaceChecks LLC, Bridgeport, CT (US)

(72) Inventors: Tarek Sobh, Shelton, CT (US); Ausif Mahmood, Shelton, CT (US)

(73) Assignee: FaceChecks LLC, Bridgeport, CT (US)

( * ) Notice: Subject to any disclaimer, the term of this patent is extended or adjusted under 35 U.S.C. 154(b) by 768 days.

(21) Appl. No.: 15/322,441

(22) PCT Filed: Jul. 15, 2015

(86) PCT No.: PCT/US2015/040652
§ 371 (c)(1),
(2) Date: Dec. 1, 2019

(87) PCT Pub. No.: WO2016/011204
PCT Pub. Date: Jan. 21, 2016

(65) Prior Publication Data
US 2020/0143148 A1 May 7, 2020

Related U.S. Application Data

(60) Provisional application No. 62/024,782, filed on Jul. 15, 2014.

(51) Int. Cl.
*G06V 40/16* (2022.01)
*G06K 9/62* (2022.01)
*G06V 10/94* (2022.01)

(52) U.S. Cl.
CPC ......... *G06V 40/172* (2022.01); *G06K 9/6215* (2013.01); *G06V 10/95* (2022.01); *G06V 40/165* (2022.01); *G06V 40/171* (2022.01)

(58) Field of Classification Search
None
See application file for complete search history.

(56) References Cited

U.S. PATENT DOCUMENTS

| | | | | |
|---|---|---|---|---|
| 8,498,453 | B1 * | 7/2013 | Benson | G06T 3/0012 382/118 |
| 2005/0147292 | A1 * | 7/2005 | Huang | G06V 40/172 382/218 |

(Continued)

FOREIGN PATENT DOCUMENTS

WO    WO-2013168171 A1 * 11/2013 ............. G06F 3/011

OTHER PUBLICATIONS

Gao, Yongsheng, and Maylor KH Leung. "Face recognition using line edge map." IEEE transactions on pattern analysis and machine intelligence 24.6 (2002): 764-779. (Year: 2002).*

*Primary Examiner* — Samah A Beg
(74) *Attorney, Agent, or Firm* — Jeffrey C. Wilk

(57) ABSTRACT

A system and method of face recognition comprising multiple phases implemented in a parallel architecture. The first phase is a normalization phase whereby a captured image is normalized to the same size, orientation, and illumination of stored images in a preexisting database. The second phase is a feature extraction/distance matrix phase where a distance matrix is generated for the captured image. In a coarse recognition phase, the generated distance matrix is compared with distance matrices in the database using Euclidean distance matches to create candidate lists, and in a detailed recognition phase, multiple face recognition algorithms are applied to the candidate lists to produce a final result. The distance matrices in the normalized database may be broken into parallel lists for parallelization in the feature extraction/ distance matrix phase, and the candidate lists may also be (Continued)

grouped according to a dissimilarity algorithm for parallel processing in the detailed recognition phase.

20 Claims, 6 Drawing Sheets

(56) References Cited

U.S. PATENT DOCUMENTS

| | | | | |
|---|---|---|---|---|
| 2008/0014563 A1* | 1/2008 | Visani | ................ | G06K 9/6235 |
| | | | | 382/118 |
| 2009/0185746 A1* | 7/2009 | Mian | ................ | G06V 20/64 |
| | | | | 382/209 |
| 2011/0299782 A1* | 12/2011 | Hamsici | ................ | G06V 10/462 |
| | | | | 382/195 |
| 2013/0251216 A1* | 9/2013 | Smowton | ................ | G06V 40/67 |
| | | | | 713/150 |
| 2014/0033223 A1* | 1/2014 | Swart | ................ | G06F 9/5066 |
| | | | | 718/105 |

* cited by examiner

MULTI-ALGORITHM-BASED FACE RECOGNITION SYSTEM AND METHOD WITH OPTIMAL DATASET PARTITIONING FOR A CLOUD ENVIRONMENT

CROSS-REFERENCE TO RELATED APPLICATION

This application claims the priority to United States ("U.S.") Provisional Patent Application Ser. No. 62/024,782, entitled "Highly-Scalable Multi-Algorithm-Based Face Recognition System with Optimal Dataset Partitioning for a Cloud Environment," filed on Jul. 15, 2014, to inventors Tarek Sobh and Ausif Mahmood, the disclosure of which is incorporated by reference herein in its entirety.

BACKGROUND OF THE INVENTION

1. Field of the Invention

The invention relates generally to a face recognition system and method, and more particularly, to a face recognition system and method that utilizes multiple algorithms in multiple stages in a parallel computer architecture.

2. Description of the Related Art

Face recognition technology has many real-life applications, such as security surveillance, access control, voter fraud prevention, check authentication at banks, content-based image retrieval, video coding, video conferencing, crowd surveillance, forensics, computer security, and intelligent human-computer interfaces, etc. Considerable research and development effort is being put into this technology at universities as well as private industry and government agencies. As the technology is improved, in terms of accuracy and scalability, more and more applications will utilize face recognition technology.

There are many different kinds of algorithms employed in existing facial detection implementations. Some of the popular approaches include:
1. Principle Component Analysis (PCA)-based techniques, e.g., EigenFaces;
2. Linear Discriminant Analysis (LDA) and Independent Component Analysis (ICA) techniques;
3. Kernel-based methods;
4. Feature-based techniques;
5. Techniques based on neural networks;
6. Techniques based on transforms; and
7. Model-based face recognition.

The Eigenface technique is based upon dimensionality reduction using Principle Component Analysis (PCA) which creates basis Eigen vectors from the stored data set of images. After applying the PCA, an image can be reconstructed from these basis vectors (called Eigenfaces). Typically around 100 Eigenfaces are enough to do a good reconstruction of an image. Thus each stored image in the dataset corresponds to a set of 100 coefficients indicating the weight by which each Eigenface is multiplied in accumulating the reconstructed image. The face recognition boils down to comparing the set of 100 coefficients obtained from the incoming image to the coeffiecients for each stored image. Eigenface technology is most accurate in well-lit, frontal image capture situations.

Linear Discriminant Analysis (LDA) is closely related to PCA in the sense that they both look for linear combinations of basis vectors which can reconstruct the image. LDA emphasizes the difference between the classes of data and finds the basis vectors in the given data set space that best discriminate among classes. For LDA to work reliably, one needs to have many known faces of a given person. Independent Component Analysis (ICA) minimizes both second-order and higher-order dependencies in the image dataset and determines bases that are statistically independent. Because ICA minimizes the higher order statistical dependencies between input data, many reported results indicate better performance than PCA-based techniques which only take into account second order statistics.

Kernel-based methods use non-linear schemes and provide a generalization of linear methods such as PCA or LDA. While the PCA- and LDA-based techniques rely on the second order statistics, i.e., pixel wise covariance between the pixels in the images in the dataset, higher order dependencies such as non-linear relationships between pixel intensities and relationships between three or more pixels encoding an edge or a curve information may provide higher accuracy in face recognition.

Feature analysis was one of the earliest popular approaches to face recognition. It may be executed much faster than the Eigenfaces technique due to simpler processing. Visionics Corp. (later acquired by Identix Inc.), a well-known facial recognition company, used Local Feature Analysis (LFA) in face recognition. LFA utilized a couple of dozen features from different regions of the face, and incorporated the relative location of these features into an 84-kbyte template. Both the type of blocks and their arrangements were used to identify and verify the face. It used the principle that the slight movement of a feature located near one's mouth will be accompanied by relatively similar movement of adjacent features. Since then, other technologies in face recognition have proven to be more accurate. However, a system can rely partially on facial features to enhance the face recognition.

Facial recognition based on neural networks has also been explored by some researchers. Neural networks determine the similarity of the unique global features of a given face to the enrolled faces, using as much of the facial image as possible. This method, theoretically, leads to an increased ability to identify faces in difficult conditions as it uses the complete facial image and with availability of more training data, can improve the recognition accuracy. However, efficiency due to training is low when the number of stored images is large.

Gabor-Wavelet transforms have been employed in some facial recognition system implementations. In this technique, faces are represented by labeled graphs, based on Gabor-Wavelet transforms. Image graphs of new faces are extracted by an elastic graph matching process and can be compared by a simple similarity function. Gabor-Wavelet-based methods can achieve high sensitivity and specificity for emotion-specified expressions (e.g., happy, sad, etc.). Another approach has been to apply the PCA on the wavelet sub-bands of an image instead of applying the PCA on the entire facial image. In this method, wavelet transform is used to decompose an image into different frequency sub-bands and then PCA is used, yielding better recognition accuracy and discriminatory power. It also reduces the computations needed when the image database is large.

One of the main problems with 2-D face recognition is that the recognition may fail due to variation in pose ranging from frontal to profile views, and across a wide range of illuminations, including cast shadows and specular reflections. Because a face is essentially a surface in a 3-D space, a 3-D model should be better suited in handling facial variations, such as pose, illumination, etc. In yet another face recognition system, a 3-D morphable face model is proposed that encodes shape and texture in terms of model parameters, and utilizes an algorithm that recovers these parameters from a single image of a face.

From the above paragraphs it is evident that some algorithms are better suited in certain conditions than others. For example, Gabor-Wavelet based algorithms seem to be best at detecting emotions in a face. Neural network-based techniques work better in noisy or poor image conditions but are relatively slow in one-to-many image comparisons such as surveillance applications. Feature-based techniques such as those used by Visionics/Identix are fast, but perhaps may not perform as well as the Eigenface or the ICA techniques in some situations. Further, variations in pose and illumination may reduce recognition accuracy. Thus there is a need for a face recognition system design and method that integrates multiple algorithms operating in parallel in such a manner that the ultimate recognition result obtained is significantly better than that achieved by any one single approach.

SUMMARY

A system and method of face recognition comprising multiple phases implemented in a parallel configuration is disclosed. The first phase may be a normalization phase whereby a captured image is normalized to the same size, orientation, and illumination of stored images in an existing database of normalized facial images. In the second phase, a distance matrix may be generated that captures distance and size information of important facial features from the normalized captured image. The metrics collected on the normalized image that make up the distance matrix may include the distance between the eyes, the distance between the eyes and the tip of the nose, the width of the mouth, the distance between the tip of the nose and the center of mouth, the distance between the bottom of chin and the center of mouth, and the distance between top left and top right landmarks on the chin and the tip of the nose. Various formulas may be applied to the collected metrics to generate the distance matrix. Similar distance matrices are generated for each of the images in the existing database.

The final two phases may comprise a first-level approximate (or coarse) face recognizer phase and a second-level detailed face recognizer phase. In the first-level approximate face recognizer phase, the distance matrices of the stored images, which may comprise a very great number of distance matrices, may be separated into parallel lists, and using a MapReduce program, a Euclidean distance match is carried out with the normalized captured image's distance matrix and the parallel lists of the distance matrices, in the map function of the MapReduce program. This parallel processing may be cloud-based and comprise multiple processing threads or nodes, each comprising a computer or processor configured for distributed processing.

If the Euclidean distances between the corresponding vectors of the distance matrices are less than a specified, predetermined threshold, a unique identifier (ID) of the distance matrix from the existing database is copied into a match list. The reduce function of the MapReduce program then assembles all the match lists into a final candidate list to be further processed in the second-level detailed face recognizer phase.

In the second-level detailed face recognizer phase, final results are produced using detailed image recognition algorithms. For large datasets where the number of images in each of the candidate lists is above a few hundred, the images of each candidate lists may be partitioned into optimized subgroups by maximizing the variance of the metrics between all subgroup members such that the mean difference between different groups is also maximized. This is formulated using a maximization equation, or equivalently a minimization of the negative of the cost function.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The examples of the invention described below can be better understood with reference to the following figures. In the figures, like reference numerals designate corresponding parts throughout the different views.

DETAILED DESCRIPTION

In the following description of the preferred and various alternative embodiments, reference is made to the accompanying drawings that form a part hereof, and in which is shown by way of illustration a specific embodiment in which the invention may be practiced. It is to be understood that other embodiments may be utilized and various structural changes may be made without departing from the spirit and scope of this invention.

Figure 1A:
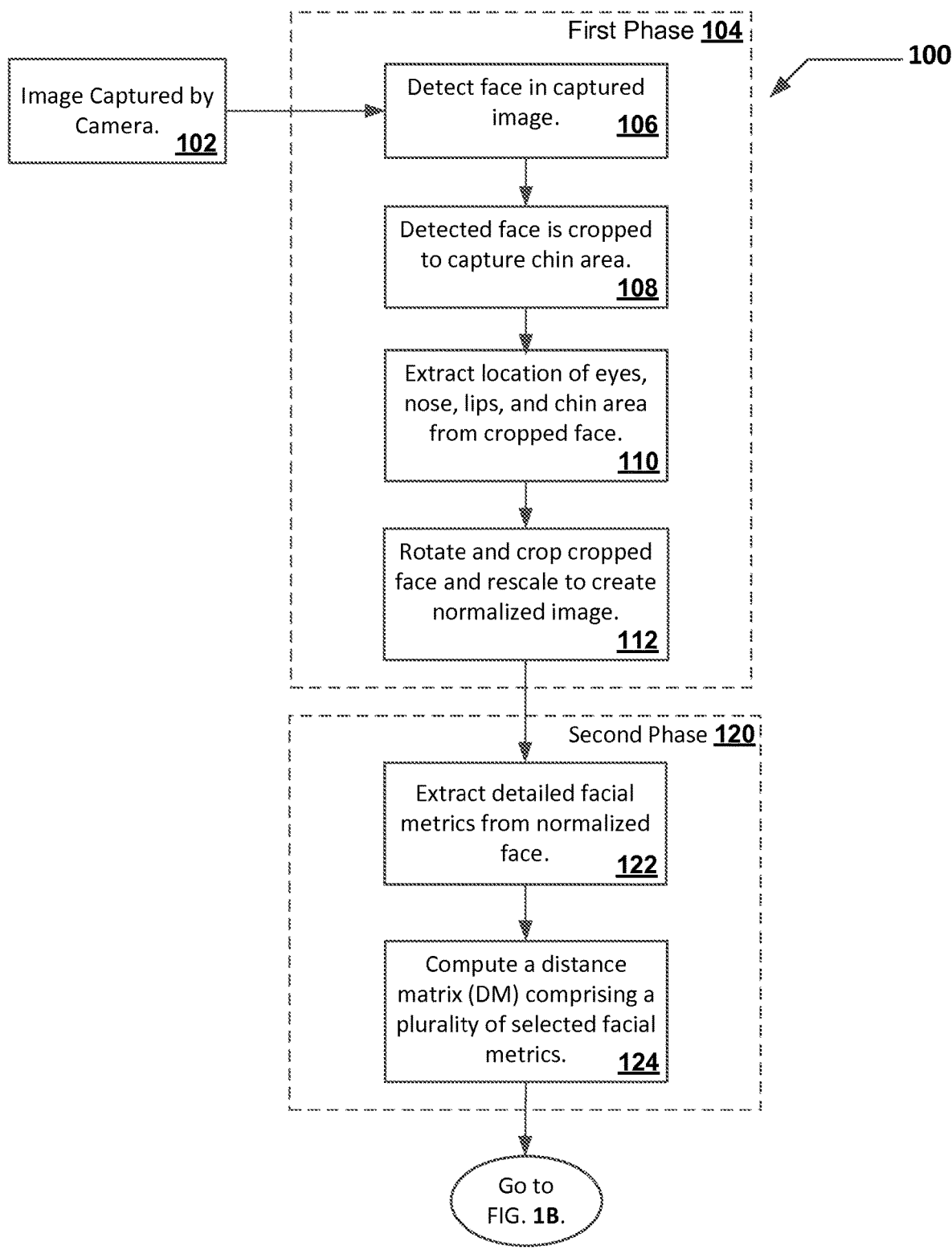
FIGS. 1A and 1B together show a flow diagram 100 illustrating an example implementation of a method of face recognition in accordance with the invention.
Figure 1B:
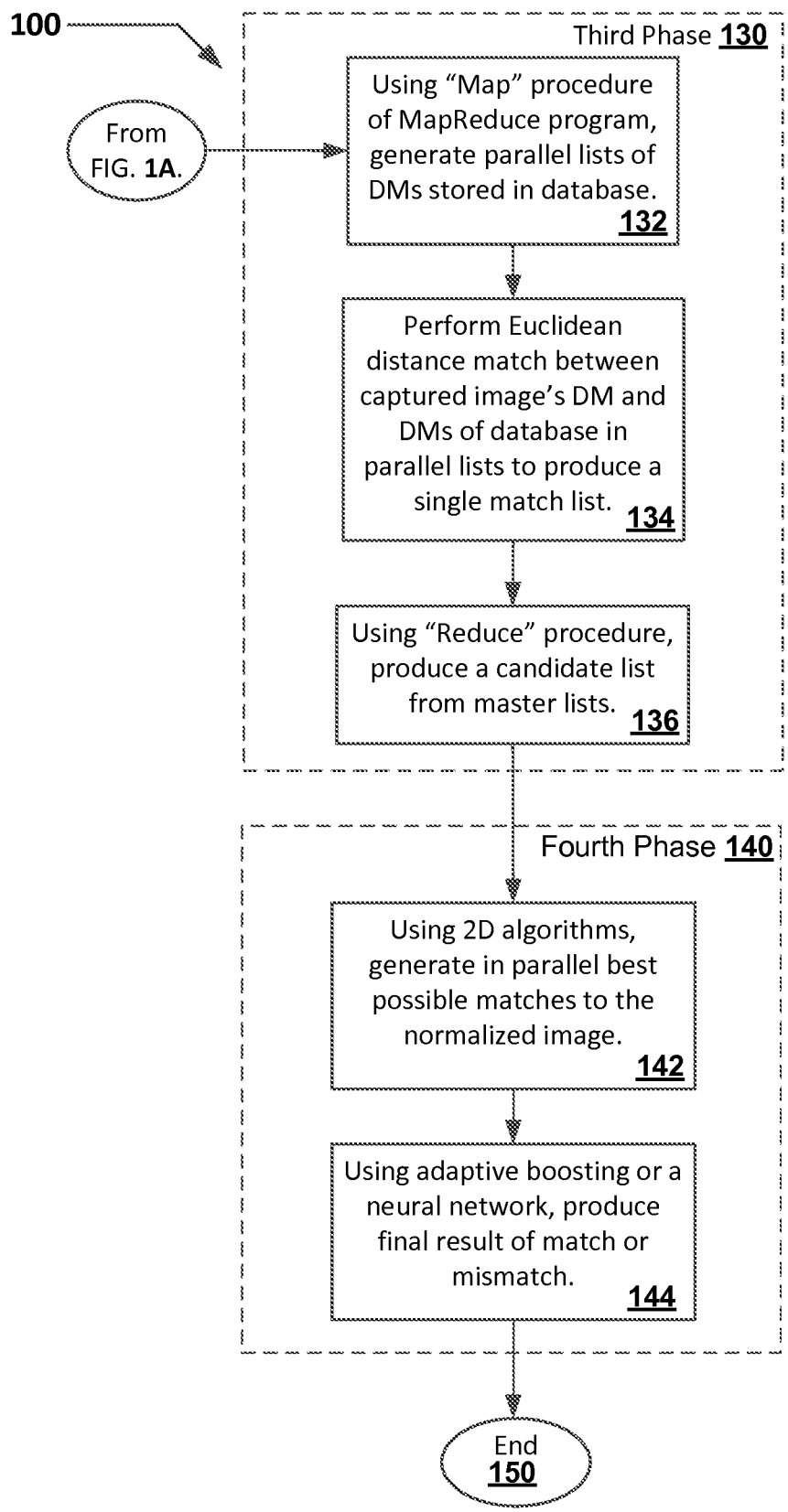

FIGS. 1A and 1B show a flow diagram 100 illustrating an example implementation of a method of face recognition in accordance with the invention. In step 102, an image of the target individual is captured by a camera. The first phase of this method of face recognition may be referred to as the normalization phase 104, which is designed to normalize the captured image to the same scale as that of collected images in a database. In step 106, the captured image may be passed through a face detector based on Haar features. This face detector may be implemented using OpenCV open-source computer vision and machine library, which may use haar-cascades for detecting objects of a particular type, e.g., faces (frontal, profile), pedestrians, etc.

Once face detection is carried out, an area that is approximately 20% bigger than the face (to guarantee that chin area is included in the face) is cropped out of the detected face in step 108, and in step 110, a parallel implementation of a flexible model or deformable template is used to locate a known object, i.e., a face, in the image. An example of such a model is the Active Shape Model described in T. F. Cootes, D. Cooper, C. J. Taylor and J. Graham, "Active Shape Models—Their Training and Application," *Computer Vision and Image Understanding*, vol. 61, No. 1, January 1995, pp.

38-59, which may be applied to the cropped image to extract the exact location of the eyes, nose, lips, and chin area of the face embedded in the image.

In step 112, the face image may then be rotated and cropped according to the following formulas:

angle of rotation=angle formed by the straight line joining the two eyes and the x-axis;

width of cropped face image=2.5*distance between the eyes; and height of cropped image=3.5*distance between the eyes;

where the angle of rotation is intended to provide a frontal face pattern.

The rotated and cropped image (centered from the tip of nose location) may be rescaled proportionally to yield a size of 100×110 pixels and may also be histogram equalized. The resulting image is referred to as the "normalized image." All images that are stored in the database have been normalized according to the same procedure.

The next phase is the feature extraction/distance matrix phase 120, where a distance matrix is generated for the normalized captured image. From the normalized captured image, a distance matrix is computed that captures the distance and size information of important facial features. In step 122, a plurality of facial metrics are collected from the normalized captured image that may include:

the distance between the eyes;
the distance between eyes and the tip of the nose;
the width of the mouth;
the distance between tip of the nose and the center of mouth;
the distance between bottom of chin and center of mouth; and
the distance between top left and top right landmarks on the chin and the tip of the nose.

In step 124, the distances calculated in step 122 are used to generate a distance matrix for the normalized captured image. The method now proceeds to the fourth phase of the method, the first-level approximate face recognizer phase 130, of FIG. 1B. In step 132, a MapReduce program is used to generate parallel lists of the distance matrices stored in the existing database. In general, MapReduce is a framework for parallel processing problems across large datasets using a large number of computers (nodes), collectively referred to as a cluster or a grid. A MapReduce program is composed of a Map( ) procedure that performs filtering and sorting and a Reduce( ) procedure that performs a summary operation on the results of the Map( ) procedure.

In a Map( ) procedure, a master node takes the input, divides it into smaller sub-problems, and distributes them to worker nodes. A worker node may do this again in turn, leading to a multi-level tree structure. The worker nodes process the smaller problems, and pass the answers back to the master node. In a Reduce( ) procedure, the master node then collects the answers to all the sub-problems and combines them in some way to form the output—the answer to the problem it was originally trying to solve, in this instance, matching a distance matrix of the normalized captured image with a distance matrix in the existing database.

Returning to FIG. 1B, in step 134 the distance matrix of the normalized captured image is Euclidean distance matched with each distance matrix in the parallel lists of distance matrices to produce multiple master lists, which are essentially lists of "possible" matches by reason of the differences between the distances of a distance matrix in the existing database and the corresponding distances of the distance matrix of the normalized captured image being less than a specified, predetermined threshold. The primary purpose of this step is to provide a method of cloud- or Internet-based distributed parallel processing that is capable of quickly reducing the very large number of images in the existing database to a much lesser number for a more detailed face recognition phase.

The detailed face recognition phase 140 starts with step 142, where the candidate list generated in step 136 is processed in parallel using another MapReduce program. In this step, a master node takes the candidate list and presents it to a plurality of 2D face recognition algorithms, where each algorithm, in parallel, produces a number of best possible matches between the distance matrices of the candidate list and the distance matrix of the normalized captured image. Examples of the 2D face recognition algorithms used in step 136 include the above-mentioned Eigenface techniques utilizing PCA or LDA, hierarchical ICA algorithms, kernel-based algorithms using LFA, face recognition algorithms based on neural networks, Gabor-Wavelet transforms, as well as various 3D morphable models. Each face recognition algorithm operating on the candidate list in parallel produces a few best possible matches to the normalized captured image, a few being, for example, 2-5 matches.

Turning to step 144, the best possible matches from the parallel processing of step 142 are processed to produce a single result, i.e., there is either a match between the normalized captured image and a single normalized image in the existing database or there are no matches. This single result may be obtained by an approach based on the AdaBoost algorithm or other algorithms based on a simple feed-forward neural network that is gradually trained on known outcomes to provide a particular weight to each of the 2-5 results (inputs to the neural network) obtained from each face recognition service.

Figure 2A:
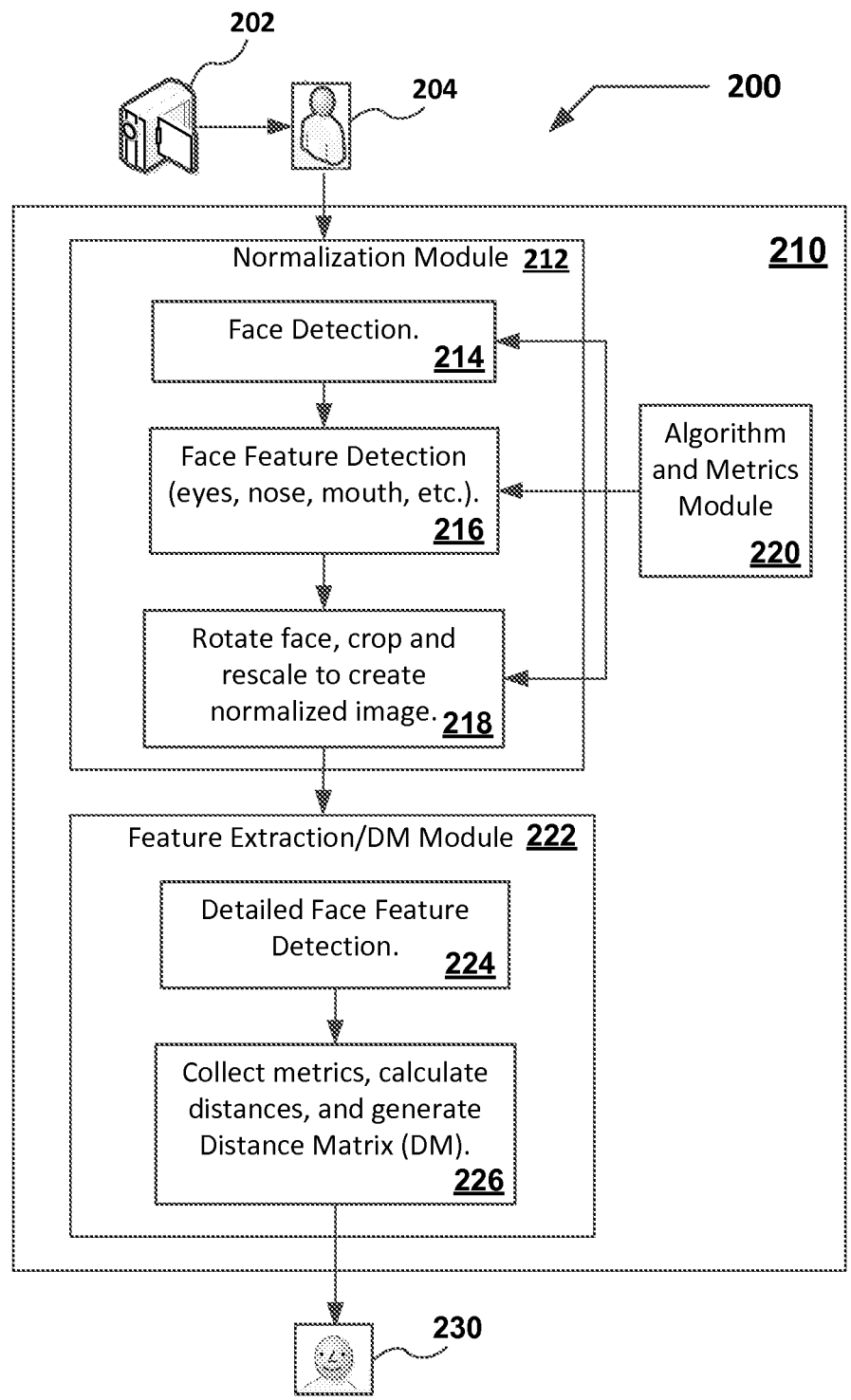
FIGS. 2A, 2B, and 2C together show a block diagram illustrating an example implementation of a face recognition system architecture in accordance with the present invention.
Figure 2B:
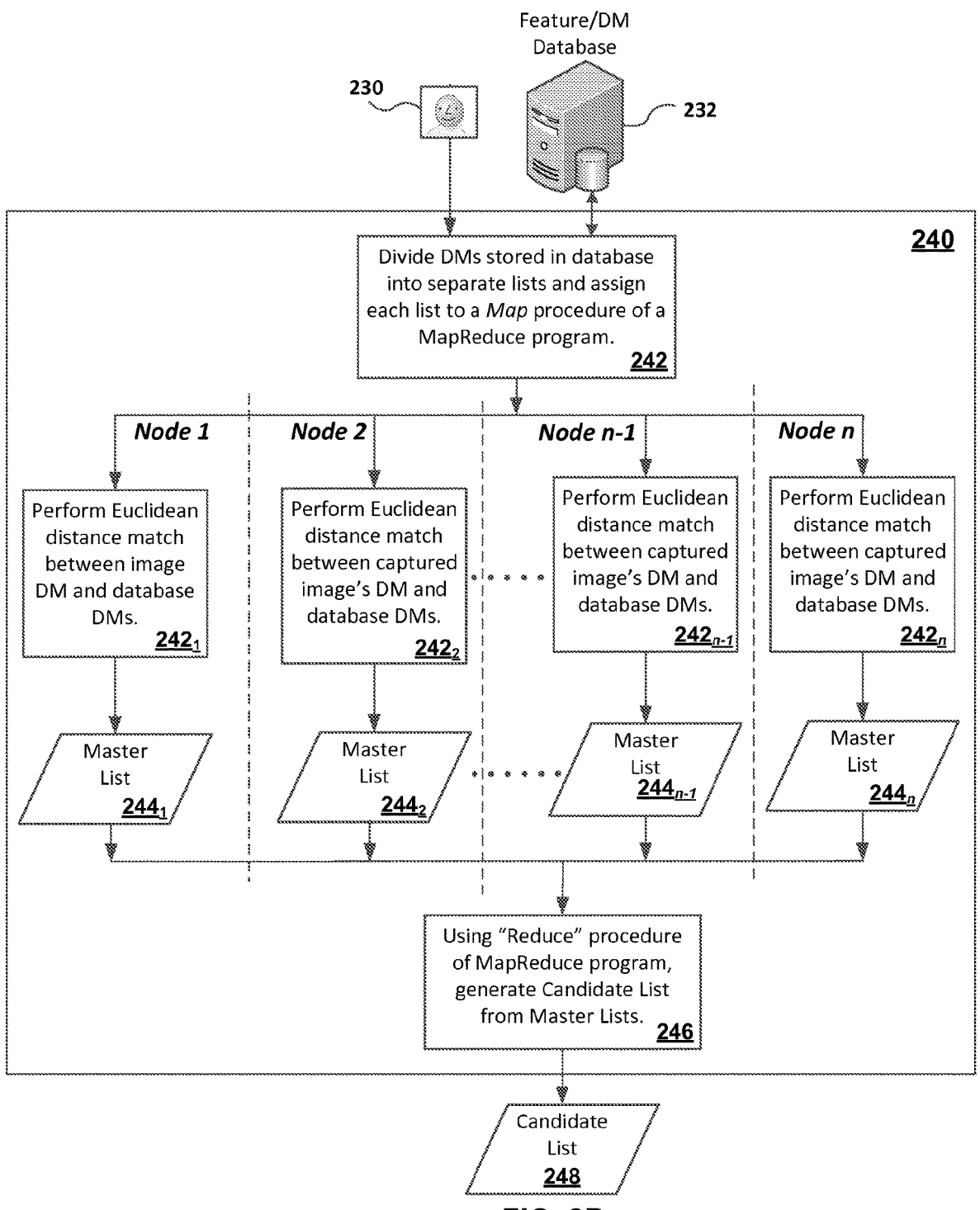
Figure 2C:
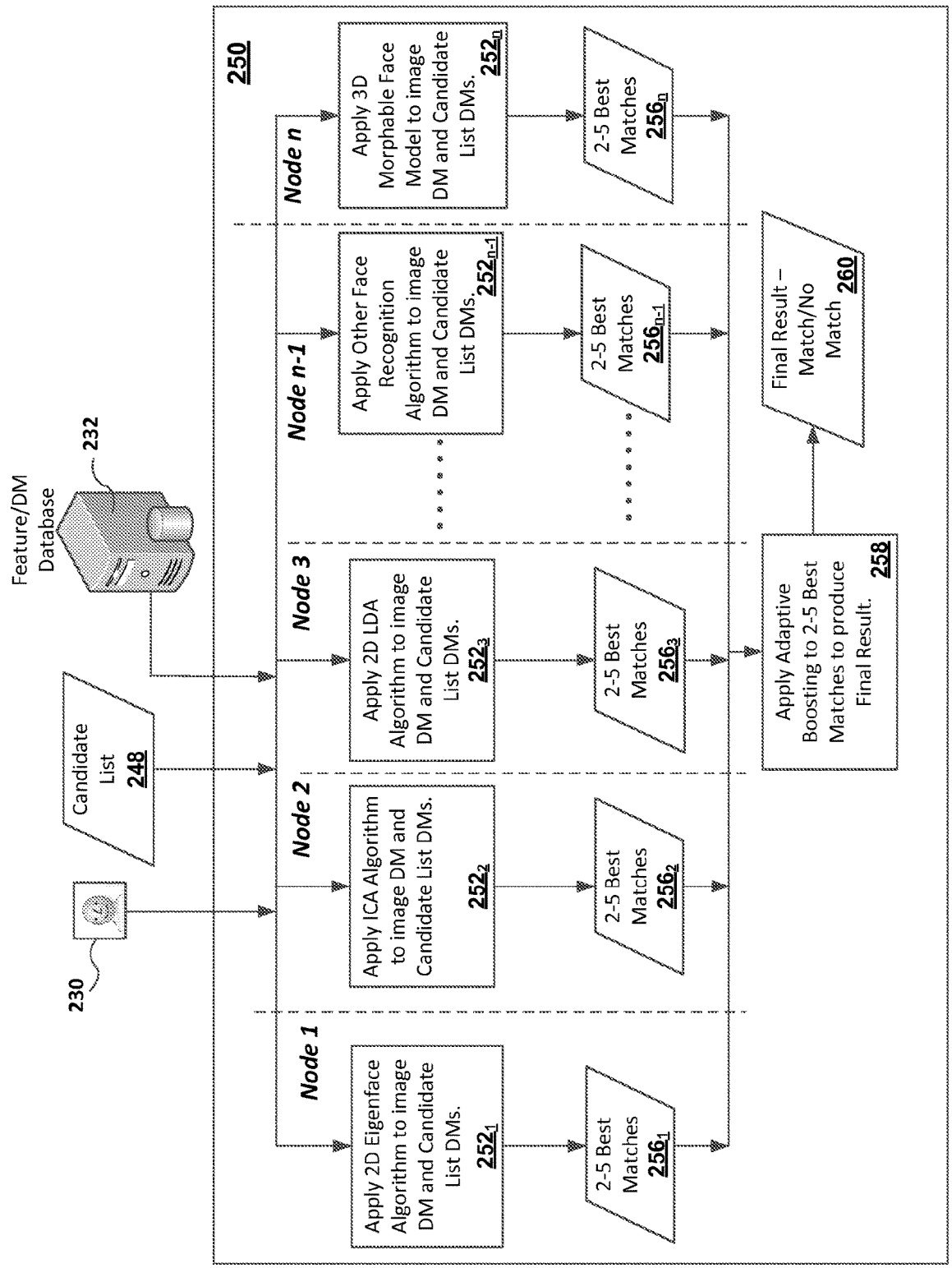

FIGS. 2A, 2B, and 2C show a block diagram illustrating an example implementation of a face recognition system architecture 200 in accordance with the present invention. The face recognition system architecture may include a camera, one or more databases, and one or more processing modules, which may include, for example, one or more microprocessors, general purpose processors, combinations of processors, digital signal processors (DSPs), field programmable gate arrays (FPGAs), or application-specific integrated circuits (ASICs). In this particular embodiment, the face recognition system architecture starts with a video camera 202 that may be positioned to capture images in various settings, for example, casinos, high-security areas, etc. A captured image 204 is obtained via video camera 202 and then processed in the normalization and extraction processing module 210, which comprises a normalization submodule 212 and a feature extraction/DM submodule.

In the normalization module 212, a face within the captured image 204 is detected by use of methods designed to detect a specified object in a given image, in this case, a face somewhere within the captured image 204, in face detection submodule 214. Examples of such methods include the Viola-Jones object detection method and other face detection methods implemented in OpenCV. Once a face is detected, the detected face may be cropped and increased by approximately 20% to ensure that the detected face will include the chin area.

Next, in face feature detection submodule 216, the exact location of the internal features of the cropped face, such as the eyes, nose, lips, and the chin, may be determined using an Active Shape Model using flexible models of image structures whose shape may vary. This is a process of landmark detection designed to provide enough detail to generate a distance matrix for the captured image 204. Because the eyes are the only features that have a strong invariant property, the distance between the eyes and the location of tip of nose may be used to normalize faces for recognition. Thus, in rotating and rescaling submodule 218, the face image may be rotated and cropped according to the following formulas:

angle of rotation=angle formed by the straight line joining the two eyes and the x-axis;

width of cropped face image=2.5*distance between the eyes; and height of cropped image=3.5*distance between the eyes.

Also in the rotating and rescaling submodule 218, the rotated and cropped image (centered from the tip of nose location) may be rescaled proportionally to yield a size of 100×110 pixels and may also be histogram equalized. The resulting image is referred to as the "normalized captured image." All images that are stored in the database 232, FIG. 2B, have also previously been normalized according to the same procedure.

The normalized captured image is then transmitted to the feature extraction/distance matrix module 222, where a distance matrix is generated for the normalized captured image. In the Detailed Face Feature Detection submodule 224, from the normalized captured image, a distance matrix is computed that captures the distance and size information of important facial features. In Distance Matrix (DM) submodule 226, metrics are calculated from the normalized captured image that may include:
 the distance between the eyes;
 the distance between eyes and the tip of the nose;
 the width of the mouth;
 the distance between tip of the nose and the center of mouth;
 the distance between bottom of chin and center of mouth; and
 the distances between top left and top right landmarks on the chin and the tip of the nose.

In DM submodule 226, the distances between the facial features of the normalized captured image calculated in submodule 224 are used to generate a distance matrix for the normalized captured image. This distance matrix may be output as the captured image record 230, which may comprise a unique identifier (ID), the normalized captured image itself, and its distance matrix. As noted earlier, Feature/DM database 232 is a pre-existing database of facial images that have been normalized to the same size, orientation, and illumination as that of the captured image record 230 and each face record in the Feature/DM database 232 may also be identified by its own ID.

Turning to FIG. 2B, the first-level approximate face recognizer module (aka the "Coarse Recognition Module") 240 of a face recognition system architecture in accordance with the present invention is shown. The Coarse Recognition Module 240 is in signal communication with Feature/DM database 232, and in general, attempts to match the captured image record 230 with one of the records in the Feature/DM database 232 in a two-stage process where the $1^{st}$ stage takes place in the Coarse Recognition Module 240 shown in FIG. 2B.

In general, MapReduce is a programming model for processing and generating large data sets with a parallel distributed algorithm on a large number of computers or nodes across geographically and administratively distributed systems. In Map submodule 242, the face records in the Feature/DM database 232 are first divided by an input reader into separate sublists of key/value pairs of the appropriate size and each sublist is assigned to a Map function of a MapReduce program for parallel processing. The Coarse Recognition Module 240 of FIG. 2B shows n distributed computers or nodes, where further processing is done by each node of n nodes in parallel and independently of the other nodes. The number of nodes is determined by the size of the database and the hardware available, giving the Coarse Recognition Module 240 the advantages of scalability and fault-tolerance.

In each of Euclidean distance matrix (DM) submodules $242_1$ through $242_n$, a Euclidean distance match is carried out with captured image record 230 against each normalized image contained within each separate sublist. If the Euclidean distances between the corresponding vectors of the distance matrices are less than a specified predetermined threshold, a unique identifier (ID) of the distance matrix from the normalized image together with the image may be copied into the respective Master Lists $244_1$-$244_n$.

In Reduce submodule 246, the Master Lists $244_1$-$244_n$ are combined and the Reduce function of the MapReduce program forms a Candidate List 248 of a reduced number of images from the Feature/DM database 232 that will undergo further processing in the fourth phase of the face recognition system architecture, the Detailed Recognition Phase 250.

FIG. 2C shows a block diagram illustrating an example implementation of the Detailed Recognition Phase 250 portion of a face recognition system architecture in accordance with the present invention. In the Detailed Recognition Phase 250, using a similar MapReduce program for parallel processing as that shown in the FIG. 2B, the captured image record 230 and the Candidate List 248 assigned by a Map function of a MapReduce program for parallel processing to submodules $252_1$ through $252_n$. Each of submodules $252_1$ through $252_n$ processes the captured image record 230 against the images of the Candidate List 248 using a different face recognition algorithm. For example, in FIG. 2C, submodule $252_1$ applies a Principle Component Analysis (PCA)-based technique, such as Eigen-Faces, to produce a few likely matches $256_1$, preferably 5 or less. Likewise, submodules $252_2$ and $252_3$ apply an Independent Component Analysis (ICA)-based technique and a Linear Discriminant Analysis (LDA) technique, respectively, each to produce the 5 or less best matches, respectively matches $256_2$ and $256_3$. Submodules $252_{n-1}$ may apply other types of techniques, such as, for example, face recognition algorithms based on neural networks or Gabor-Wavelet transforms, and submodule $252_n$ may apply, as an example, a 3D morphable model.

Once the parallel processing of submodules $252_1$ through $252_n$ is completed, the best matches lists $256_1$ through $256_n$ that are derived using several different face recognition techniques, are reduced in submodule 258 using another Reduce function of a MapReduce program to produce a Final Result 260. Submodule 258 may use the Adaptive Boosting (AdaBoost) machine-learning algorithm formulated by Yoav Freund and Robert Schapire, or any other similar groupings of algorithms that may be used in conjunction with the AdaBoost algorithm, such as a Haar Classifier algorithm. Another approach may be a simple feed-forward neural network model that is gradually trained on known outcomes to provide a particular weight to each of the 2-5 matches (inputs to the neural network) obtained from each face recognition group. The Final Result 260 will generally be a match between the captured image record 230 and a single normalized image of the Feature/DM database 232, or an indication that there is no such match.

It is recognized by those skilled in the art that the recognition rate using Eigenface techniques and ICA and LDA algorithms decreases if the number of images in the database exceeds approximately 100 images. This drawback may be overcome by dividing a large database into groups each having 100 or less images. To optimize the face recognition rate within these groups, the groups may be determined such that each group has the maximum variance between its group members, that is, the variance between all members is maximized. This technique may be mathematically stated by the following equation:

$$\sigma_{total} = \sum_{j=1}^{N} \sum_{i=1}^{(m \times n)} \sigma_{ij}, \quad (1)$$

where m, n and N are the number of rows and columns of the face image and number of groups respectively, and $\sigma_{ij}$ is the standard deviation of image dimension i in the group j.

Equation (1) will work perfectly if the number of hierarchical group levels is 2. However, if the image database is large, then it may be necessary to regroup again to the third or higher levels. In this case, another term is added to equation (1) to guarantee that the variance of the next grouping stage will also be maximized. This term deals with the additional groups' mean (the difference between means of different groups), which will lead to causing groups far from each other to have the maximum variance between all group members, and is shown in the following equation:

$$\mu_{diff\_Total} = \sum_{j=1}^{L} \sum_{i \neq j}^{L} d(\mu_i, \mu_j), \quad (2)$$

where $d(\mu_i, \mu_j)$ is the Euclidean distance between the mean of group i and the mean of group j, and L is the number of group levels.

Equation (3) thus mathematically states the required objective function to be maximized:

$$\max_{I_{ij}} g(I_{ij} = (\sigma_{total} + \mu_{diff\_Total}), \quad (3):$$

where I is the face image vector.

Equation (3) can also be expressed in terms of minimization as given in equation (4):

$$\min_{I_{ij}} f(I_{ij}) = \min_{I_{ij}} (-\sigma_{total} - \mu_{diff\_Total}). \quad (4)$$

The optimized group generation from the minimization of equation (4) can be done in a separate process from the face recognition process through the use of metaheuristics such as simulated annealing, Tabu search, or Ant Colony Optimization (ACO). Of these, ACO has very good parallel execution properties as all ants in the colony can be launched in parallel, thus causing less overhead on the overall face recognition execution time. Once the groups are optimized in terms of variance, the optimized groups may be processed by the submodules $252_1$ through $252_n$ of Detailed Recognition Phase 250 shown in FIG. 2C.

Figure 3:
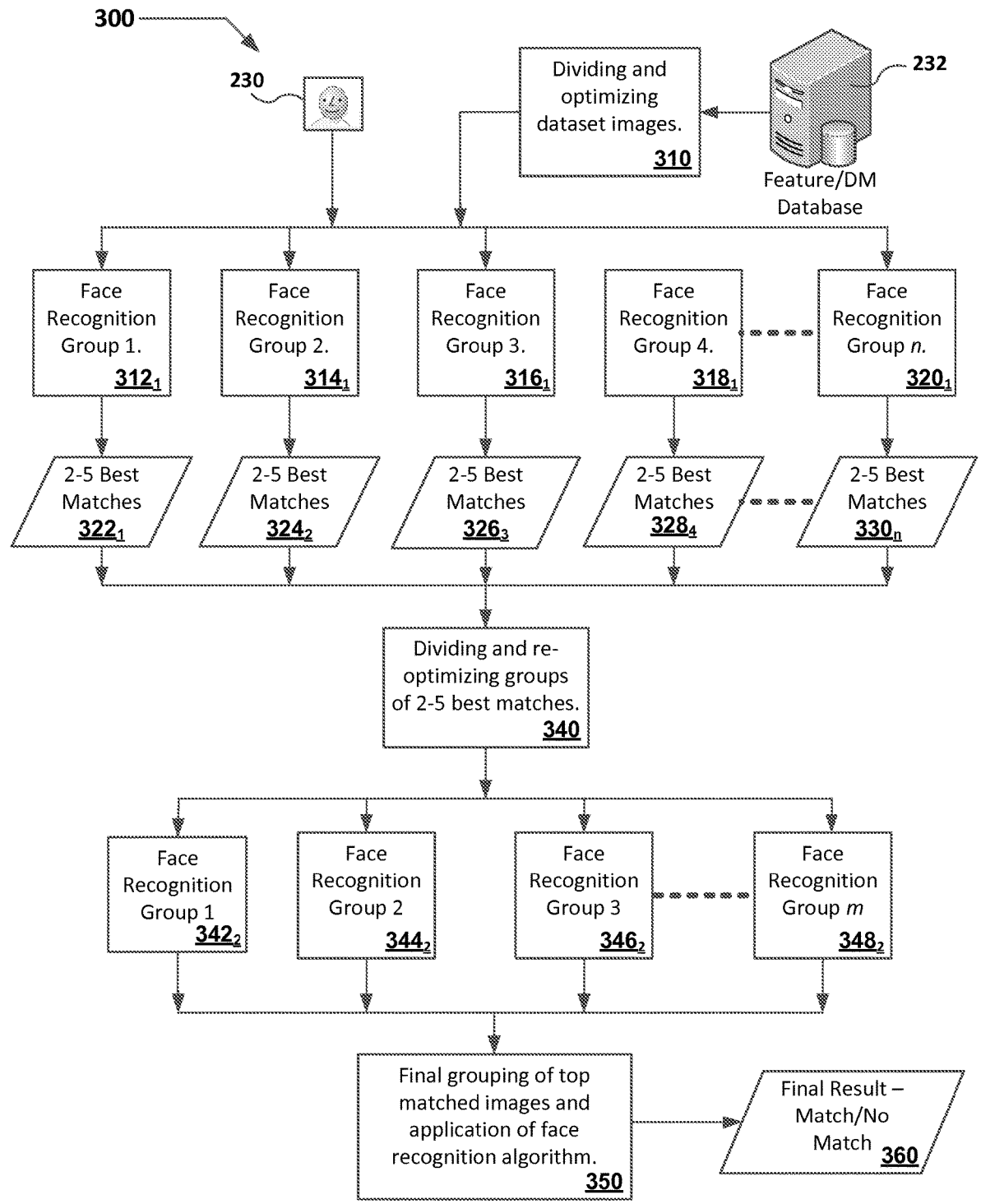
FIG. 3 shows a block diagram of another example implementation of a face recognition system architecture in accordance with the present invention that utilizes hierarchical levels of optimized grouping of image datasets before applying various face recognition algorithms in accordance with the present invention.

Turning to FIG. 3, a block diagram of an example implementation of a face recognition system architecture in accordance with the present invention that utilizes hierarchical levels of optimized grouping of image datasets before applying various face recognition algorithms in accordance with the present invention is shown. In submodule 310, the normalized images from Feature/DM Database are divided into groups each consisting of approximately 100 or less normalized images. Each of the groups may be optimized to maximize the variance in each group using equation (3) in a separate distributed parallel-execution using metaheuristic algorithms to generate n groups, where n is a plurality of computers, processors, or nodes configured for distributed parallel processing.

Upon completion of the division and optimization in submodule 310, the optimized groups are sent to submodules $312_1$-$320_1$, respectively, where a face recognition algorithm is applied to each group in order select a few top matched images with the captured image record 230, for example, preferably 2-5 matches, which are shown as 2-5 Best Matches lists $322_1$-$330_n$.

2-5 Best Matches lists $322_1$-$330_n$ are next sent to submodule 340, where the images comprising the 2-5 Best Matches lists $322_1$-$330_n$ are divided into groups each consisting of approximately 100 or less normalized images. Each of these groups are also optimized to maximize the variance in each group using equation (3) in a separate distributed parallel-execution using metaheuristic algorithms to generate m groups, where m is a plurality of computers or nodes configured for distributed parallel processing that is less than n of the higher level optimization at the prior level 1.

Upon completion of the division and optimization in submodule 340, the optimized groups are sent to submodules $342_2$-$348_m$, respectively, where the same face recognition algorithm is applied to each group in order to again select a few top matched images with the captured image record 230, for example, preferably 2-5 matches. If these few top matched images number approximately 100 images or less, these images are processed in submodule 350 to produce a final result 360.

As in submodule 258 of FIG. 2C, submodule 350 may use an AdaBoost machine-learning algorithm or any other similar groupings of algorithms that may be used in conjunction with the AdaBoost algorithm, or a neural networks model utilizing a learning process, and the Final Result 360 will generally be a match between the captured image record 230 and a single normalized image of the Feature/DM database 232, or an indication that there is no such match.

Returning to submodule 340, if the 2-5 Best Matches lists $322_1$-$330_n$ resulting from the processing of submodules $312_1$-$320_1$ do not comprise substantially more than 100 images, there is then no need for the processing of submodule 340. Conversely, if after the processing of submodules $342_2$-$348_2$ there are still substantially more than 100 images remaining, the processing provided in submodule 340 may be repeated. Accordingly, whereas FIG. 3 shows two levels of hierarchical partitioning of image datasets, i.e., level one consists of submodules $312_1$-$320_1$, and level two consists of submodules $342_2$-$348_2$, the hierarchical partitioning shown in FIG. 3 may comprise three or more hierarchical levels in other embodiments.

The foregoing description of one or more implementations has been presented for purposes of illustration and description. It is not exhaustive and does not limit the claimed inventions to the precise form disclosed. Modifications and variations are possible in light of the above description or may be acquired from practicing the invention. First, submodule

What is claimed is:

1. A method of scalable, parallel, cloud-based face recognition utilizing a database of normalized stored images previously normalized according to the process below, comprising:
    capturing an image using a camera;
    detecting a face in the captured image;
    normalizing the detected facial image to match the normalized stored images;
    identifying facial features in the normalized detected facial image;
    generating a plurality of facial metrics from the facial features of the normalized detected facial image;
    generating a distance matrix ("DM") from the plurality of the facial features of the normalized detected facial image;
    performing a Euclidean distance match between the DM of the normalized detected facial image and corresponding DMs of each of the normalized stored images;
    comparing each Euclidean distance match against a specified predetermined threshold;
    if the Euclidean distance match is less than the specified predetermined threshold, copying the DM of the normalized detected facial image into a reduced candidate list of best possible image matches from the normalized stored images;
    comparing, in parallel, the DM of the normalized detected facial image with each of the DMS of the normalized stored images of the reduced candidate list utilizing a plurality of face recognition algorithms, where each processor of a parallel processing system comprising a plurality of processors uses a different face recognition algorithm;
    responsive to the comparison, producing best match results from each parallel subset of the reduced candidate list; and
    selecting a final match from the best match results using a deep learning neural network face recognition algorithm trained on outputs of individual face recognition algorithms.

2. The method of scalable, parallel, cloud-based face recognition of claim 1, wherein detecting a face in the captured image comprises:
    utilizing OpenCV to detect a face in the captured image;
    extracting the location of the eyes and a tip of the nose in the face;
    determining a distance between the eyes;
    cropping the face from the captured image, where the width and the height of a cropped face image is a function of the distance between the eyes;
    rotating the face by an angle of rotation that is a function of the distance between the eyes.

3. The method of scalable, parallel, cloud-based face recognition of claim 2, wherein:
    the width of the cropped face image is 2.5 times the distance between the eyes;
    the height of the cropped face image is 3.5 times the distance between the eyes; and
    the angle of rotation is an angle formed by a straight line joining the eyes and an x-axis of the face.

4. The method of scalable, parallel, cloud-based face recognition of claim 3, wherein rotating the face comprises rotating the face to provide a frontal face pattern.

5. The method of scalable, parallel, cloud-based face recognition of claim 4, further comprising the step of proportionally rescaling the cropped and rotated image.

6. The method of scalable, parallel, cloud-based face recognition of claim 5, where the proportional rescaling yields a cropped and rotated image with a size of 100×110 pixels.

7. The method of scalable, parallel, cloud-based face recognition of claim 1, wherein the facial features identified in the normalized detected facial image comprise a pair of eyes, a tip of a nose, a mouth, a center of the mouth, and a chin area comprising a bottom, a top left landmark, and a top right landmark.

8. The method of scalable, parallel, cloud-based face recognition of claim 7, wherein generating a plurality of facial metrics comprises:
    calculating a distance between the pair of eyes, a distance between the eyes and the tip of the nose, a distance equal to the width of the mouth, a distance between the tip of the nose and the center of mouth, a distance between the bottom of chin and the center of mouth, a distance between the top left landmark on the chin and the tip of the nose, and a distance between the top right landmark on the chin and the tip of the nose.

9. The method of scalable, parallel, cloud-based face recognition of claim 8, wherein performing a Euclidean distance match further comprises:
    partitioning the previously normalized stored images into a plurality of substantially equal subsets;
    performing a Euclidean distance match between the DM of the facial metrics of the normalized detected facial image and the corresponding DMs of the facial metrics of each of the stored images of the subsets of the normalized stored images with a separate processor of a parallel processing system to generate a Euclidean distance match for each stored image of the subset;
    comparing each Euclidean distance match against a specified predetermined threshold with the separate processors;
    if the Euclidean distance match is less than specified predetermined threshold, producing a reduced candidate list of best possible image matches from the normalized stored images of each subset by copying a captured image record comprising a unique identifier ("ID"), the normalized detected facial image itself, and its DM into the corresponding reduced candidate list; and
    upon completion of the processing by all separate processors of the parallel processing system, combining the reduced candidate lists from each subset to produce a single reduced candidate list.

10. The method of scalable, parallel, cloud-based face recognition of claim 9, wherein the plurality of face recognition algorithms utilized in comparing, in parallel, the normalized detected facial image with each of the normalized stored images of the reduced candidate list, consists of face recognition algorithms selected from a group consisting of Principle Component Analysis (PCA)-based algorithms, Linear Discriminant Analysis (LDA) algorithms, Independent Component Analysis (ICA) algorithms, kernel-based algorithms, feature-based techniques, algorithms based on neural networks, algorithms based on transforms, and model-based face recognition algorithms.

11. The method of scalable, parallel, cloud-based face recognition of claim 10, wherein the PCA-based algorithms include Eigenfaces for face detection/recognition, and the LDA algorithms include the Fisherfaces method of face recognition.

12. The method of scalable, parallel, cloud-based face recognition of claim 1, wherein comparing, in parallel, the captured image with each of the normalized stored images of the reduced candidate list further comprises:
   partitioning the reduced candidate list into a plurality of substantially equal subsets;
   processing each subset in a different processor of the parallel processing system that uses a unique face recognition algorithm to produce the best match results; and
   using a reduce function of a MapReduce program to combine the best match results from each of the subsets to produce a single set of the best match results.

13. The method of scalable, parallel, cloud-based face recognition of claim 12, wherein partitioning the reduced candidate list comprises:
   selecting the images comprising each subset by optimizing the variance between of each of the images according to the following equation:

$$\sigma_{total} = \sum_{j=1}^{N} \sum_{i=1}^{(m \times n)} \sigma_{ij},$$

where m and n are the number of rows and columns of the face vector image, N is the number of groups, and $\sigma_{ij}$ is the standard deviation of image dimension i in the group j of the face image vector.

14. The method of scalable, parallel, cloud-based face recognition of claim 13, wherein selecting the images comprising each subset by optimizing the variance between each of the images according to the following equation:

$$\max_{I_{ij}} g(I_{ij}) = \max_{I_{ij}} (\sigma_{total} + \mu_{diff\_Total}),$$

where $$\mu_{diff\_Total} = \sum_{j=1}^{L} \sum_{i \neq j}^{L} d(\mu_i, \mu_j),$$

where $d(u_i, u_j)$ is the Euclidean distance between the mean of the group i and the mean of group j, I is the face image vector, and L is the number of group levels.

15. The method of scalable, parallel, cloud-based face recognition of claim 1, where selecting a final match from the best match results utilizing a deep learning neural network face recognition algorithm comprises utilizing either an AdaBoost machine learning algorithm or a neural networks machine-learning model.

16. The method of scalable, parallel, cloud-based face recognition of claim 1, where normalizing the detected facial image to match the normalized stored images includes normalizing the detected facial image to the same size, orientation, and illumination of the normalized stored images.

17. A non-transitory computer-readable medium containing executable program instructions for causing a computer to perform a method of face recognition utilizing a database of normalized stored images previously normalized according to the process below, the method comprising:
   detecting a face in an image captured by a camera used for capturing video or photographs;
   normalizing the detected facial image to match the normalized stored images;
   identifying facial features in the normalized detected facial image;
   generating a plurality of facial metrics from the facial features of the normalized detected facial image;
   generating a distance matrix ("DM") from the plurality of the facial features of the normalized detected facial image;
   performing a Euclidean distance match between the DM of the facial metrics of the normalized detected facial image with corresponding DMs of the facial metrics of each of the stored images;
   comparing each Euclidean distance match against a specified predetermined threshold;
   if the Euclidean distance match is less than the specified predetermined threshold, copying the DM of the normalized detected facial image into a reduced candidate list of best possible image matches from the normalized stored images;
   comparing, in parallel, the DM of the normalized detected facial image with each of the DMs of the normalized stored images of the reduced candidate list utilizing a parallel processing system comprising a plurality of processors and a plurality of face recognition algorithms, where each processor of the parallel processing system uses a different face recognition algorithm;
   responsive to the comparison, producing best match results from each parallel subset of the reduced candidate list; and
   selecting a final match from the best match results using a deep learning neural network face recognition algorithm trained on outputs of individual face recognition algorithms.

18. The non-transitory computer-readable medium containing executable program instructions of claim 17, wherein the plurality of face recognition algorithms utilized in comparing, in parallel, the normalized detected facial image with each of the normalized stored images of the reduced candidate list, consists of face recognition algorithms selected from a group consisting of Principle Component Analysis (PCA) based algorithms, Linear Discriminant Analysis (LDA) algorithms, Independent Component Analysis (ICA) algorithms, kernel-based algorithms, feature-based techniques, algorithms based on neural networks, algorithms based on transforms, and model-based face recognition algorithms.

19. The non-transitory computer-readable medium containing executable program instructions of claim 18, wherein the PCA-based algorithms include Eigenfaces for face detection/recognition, and the LDA algorithms include the Fisherfaces method of face recognition.

20. The non-transitory computer-readable medium containing executable program instructions of claim 17, where selecting a final match from the best match results utilizing a deep learning neural network face recognition algorithm comprises utilizing either an AdaBoost machine-learning algorithm or a neural networks machine learning model.

* * * * *